United States Patent Office 3,539,478
Patented Nov. 10, 1970

3,539,478
GROUND COHUNE NUT SHELL FILLER AND EXTENDER MATERIAL FOR THERMOSETTING FORMALDEHYDE RESIN ADHESIVE
William H. McDow, Brownsville, Tenn., and Mark F. Adams, Pullman, Wash., assignors to Etablissement Organic Products, Vaduz, Liechtenstein, a corporation of Liechtenstein
No Drawing. Continuation-in-part of application Ser. No. 734,833, June 6, 1968. This application Oct. 14, 1968, Ser. No. 767,484
Int. Cl. C08g 51/14
U.S. Cl. 260—17.2
4 Claims

ABSTRACT OF THE DISCLOSURE

A thermosetting formaldehyde resin adhesive is described having a filler and extender containing flour made from ground cohune nut shells for producing an adhesive having low viscosity and high strength and long shelf life properties.

RELATED APPLICATION

This application is a continuation-in-part application, based on an abandoned application, Ser. No. 734,833, filed June 6, 1968, on a "Filler and Extender for Phenol-Formaldehyde Adhesive."

BACKGROUND OF THE INVENTION

This invention relates to adhesives and more particularly to fillers and extenders for thermosetting formaldehyde resin adhesives that are used in the manufacture of wood products such as plywoods.

Thermosetting formaldehyde resin adhesives have long been used in the manufacture of plywood, particularly for exterior plywood. Filler and extender materials have been added to the synthetic resin for adding bulk to lower the overall cost and for regulating the flow characteristics of the adhesives. An extender is generally defined as a material that exhibits adhesive action and that can be combined with a resin in an adhesive mix to lower the wet mix cost while technically a filler is defined as an inert material that does not contribute adhesive properties to the mixture. Frequently the same material serves both as a filler and extender. Extenders are generally classed as nonprotein or protein. The most commonly used nonprotein extender is Furafil which is deriverd from a distillate sludge remaining from the acid hydrolysis of corn cobs in the manufacture of furfural. Bark derivatives have found some application as extenders in softwood plywood mixes. Wood flour, starch and dextrine have also been used. U.S. Letters Patent No. 3,093,605 describes an extender composition utilizing the degradation residue of shells such as walnut, pecan and almond and fruit pits such as apricot and peaches. The United States Department of Agricultural Report, "Nut Shells and Fruit Pits, Their Composition, Availability, Agricultural and Industrial Uses," by T. F. Clark and E. C. Lathrop, February 1953, describes the testing of the pits of apricots, cherries, peaches and dates and the shells of almonds, coconuts, filberts, peanuts, pecans and both English and black walnuts for use as filler material in plywood adhesives. Several clays have been employed as filler materials.

Conventionally, during the manufacture of the plywood, the filler and extender material is added to the thermosetting neat resin just before the adhesive is applied to the plywood. The stability or shelf life of the thermosetting formaldehyde neat resin by itself will range from 1 to 6 months at 70 degrees F. to 2 to 12 weeks at 90 degrees F., while the stability or shelf life of the neat resin with the filler and extender added has been quite short—frequently less than 24 hours. This means that the filler and extender material must be added to the neat resin just before the adhesive is applied to the plywood. Generally the adhesive is made up in batches for use during a short period of time. It is well recognized that it is difficult to obtain consistent and uniform results in this manner. For instance, it has been estimated that at the present time approxmately 25% of the plywood made from southern loblolly pine has defective glue lines and must be rejected.

One of the prncipal objects of this invention is to provide an adhesive having a filler and extender material that has a substantial shelf life, for example a week, but this period could be longer, enabling the adhesive, including the filler and extender material, to be made up at the plant of the adhesive manufacturer.

An additional object is to provide an adhesive that has a new filler and extender material that has high strength characteristics and can be prepared to obtain more consistent and uniform results.

A further object of this invention is to provide an adhesive that substantially reduces the cost of preparation and handling of the adhesive for application on the plywood veneers.

It has been found that the use of a relatively small amount of conventional extender and filler material will show very little reduction in the strength of the adhesive, but will give more reliable and uniform results. However, the use of large amounts of conventional extender and filler material frequently sharply reduces the quality of the adhesive. The American Plywood Association Plywood Standard PSI–66 requires that the adhesive applied to plywood contain at least 26% resin solids. This standard limits the amount of extender and filler material that may be added to the resin.

Another limiting factor is the amount of filler and extender material that may be added to the thermosetting formaldehyde resin adhesive is the viscosity of the adhesive. The more viscous the adhesive the more difficult it is to apply the adhesive uniformly to the wood surfaces. Frequently it has been found necessary to add alcohol to the adhesive to reduce the viscosity sufficiently to adequately and uniformly apply the adhesive on the wood. This is particularly true when spray application is employed or attempted.

Frequently there are many advantages of being able to spray the adhesive onto the wood surfaces as opposed to direct application by rollers. Often it is easier to obtain more uniform quality results by spraying. By spraying the adhesive it is easier to handle and is not as messy.

Another of the principal objects of the invention is to provide a new filler and extender material for thermosetting formaldehyde resin adhesives that decreases the viscosity of the adhesive without spoiling the bonding qualities of the adhesive.

An additional object of the invention is to provide a filler and extender material for thermosetting formaldehyde resin adhesive that may be added in greater quantities than previous filler and extender material without increasing the viscosity beyond reasonable limits.

Another very important object is to utilize what was previously thought to be a waste material as a filler and extender for plywood adhesives. This should provide new income and natural resource industry to areas of the world that are very much in need of same.

These and other objects and advantages of the invention will become apparent upon the reading of the following detailed description of the preferred embodiment.

DETAILED DESCRIPTION OF A PREFERRED AND ALTERNATE EMBODIMENTS

General

The applicant has found that a thermosetting formaldehyde resin adhesive containing the ground flour of the shell of the cohune nut has unusual properties that are particularly favorable for laminating plywood veneers together.

The cohune species or "Prince of Wales palm" was formally assigned to the genus Attalea but botanical taxonomists following the modern practice of lumping together closely related genera together now refer to the species as *Orbignya cohune*. A large number of cohune trees are found in Central America, particularly British Honduras, where land bearing a notable proportion of cohune trees is shown on officially published forestry maps. The cohune tree has been depicted on postage stamps in British Honduras. The cohune nut or fruit has a kernel, a thick hard shell about the kernel and a husk material surrounding the shell, surmounted by a pericarp. The kernel of the cohune nut contains a substantial amount of oil or fat containing between 40 and 50 percent of lauric acid; it is used as an edible oil or fat and is known to be of value as a raw material for the manufacture of soaps and detergents. The shell of the cohune nut which is very hard has been thought of as substantially a waste material except for its occasional use as a fuel or for making charcoal.

In the preparation of test specimens, shells of cohune nuts were ground into a flour and then sifted through a standard 200 mesh Tyler screen to provide a flour having particles of less than 74 microns in diameter. Under the microscope the shell flour particles appear to be generally rounded with few sharp corners or edges. The flour was then added directly to a thermosetting formaldehyde resin. One of the most unusual results was that the cohune nut flour remained in suspension in the resin even after several days giving the adhesive a substantial pot or shelf life. Presently used filler and extender materials separate out after a few hours.

PHENOL FORMALDEHYDE RESIN ADHESIVE

Four different types of thermosetting formaldehyde resin adhesives were tested—phenol, urea, melamine, and resorcinol.

For comparison purposes, one of the most popular and widely used phenolic adhesives for southern loblolly pine was utilized as a standard. The standard adhesive has a weight composition of: neat phenol-formaldehyde resin 60.4%, Furafil 8.6%, wheat flour 3.4%, 50% sodium hydroxide 3.4%, anhydrous sodium carbonate 1.3% and water 22.9%. Such an adhesive mixture has a viscosity of approximately 9200 cps. at 5 r.p.m. and 20 degrees C. as measured by a Brookfield viscometer. The Furafil and wheat flour constitutes the filler and extender material.

The test adhesive, containing the cohune nut flour, had a weight composition as follows: neat phenol-formaldehyde resin 60.4%, cohune nut shell flour 13.3%, 50% sodium hydroxide 3.4%, water 22.9%. The test adhesive had a viscosity of approximately 2000 cps. at 5 r.p.m. and 20 degrees C.

The test adhesive and the standard adhesive were spread on southern loblolly pine veneers having 1% or less moisture content to form test panels having 65 lbs. and 85 lbs. of adhesive per 1000 sq. ft. of double glue line. The test adhesive was very easy to spread uniformly over the veneers. Three different layup times—5 minutes, 20 minutes and 30 minutes—were utilized for comparison purposes. Each test panel was pressed for 5½ minutes at 200 p.s.i. pressure in a press set at 285 degrees F. The panels then were permitted to cool slowly in an oven to more closely simulate actual manufacturing conditions.

After the panels were formed, test specimens were cut from such panel. Industry-accepted wet tensile test procedures were performed on the specimens in accordance with the American Plywood Association Product Standard PSI–66. The following charts display the results of the tests:

STANDARD ADHESIVE

| | 65 lb. glue line | | 85 lb. glue line | |
|---|---|---|---|---|
| | Tensile strength, p.s.i. | Wood failure, percent | Tensile strength, p.s.i. | Wood failure, percent |
| Layup time, minutes: | | | | |
| 5 | 142 | 84 | 150 | 87 |
| 20 | 107 | 79 | 124 | 86 |
| 30 | 60 | 44 | 101 | 83 |

TEST ADHESIVE
[Cohune nut shell]

| | 65 lb. glue line | | 85 lb. glue line | |
|---|---|---|---|---|
| | Tensile strength, p.s.i. | Wood failure, percent | Tensile strength, p.s.i. | Wood failure, percent |
| Layup time, minutes: | | | | |
| 5 | 139 | 83 | 167 | 79 |
| 20 | 108 | 78 | 135 | 87 |
| 30 | 55 | 34 | 105 | 83 |

From the test results, it can be concluded that the test adhesive performs as well and in some particulars better than the standard phenolic adhesives and has the added advantages of a long pot life, less viscosity and easier handling.

Through additional testing it appears that the proportion of alkali material—sodium hydroxide or sodium carbonate—can be substantially reduced or eliminated in some applications. It was also found that the addition of small amounts of powder of the cohune nut husk to the adhesive is very effective in increasing the viscosity of the adhesive in a controllable manner for industrial conditions where a higher viscosity is required.

UREA FORMALDEHYDE RESIN ADHESIVE

"Plyamine," a commonly used urea formaldehyde resin adhesive for plywood production, was utilized as a standard adhesive. "Plyamine" contains 87.2% urea formaldehyde neat resin formation (65% resin), 7% ground walnut shell filler and extender material and 5.8% catalyst. To form a test adhesive, ground cohune nut shell was substituted in place of the ground walnut shell. Standard and test plywood specimens were prepared having 85 lb. glue lines. After the plywood specimens were layed up, the specimens were pressed for 4½ minutes at 250 degrees F.

Industry-accepted wet tensile tests were performed on the specimens. The standard specimens exhibited tensile strength of 225 p.s.i., having 78% wood fiber failures. The test specimens, in comparison, exhibited tensile strength of 247 p.s.i. having 85% wood fiber failures. From these results, it is evident that the test adhesive performed better than the standard adhesive.

MELAMINE FORMALDEHYDE RESIN ADHESIVE

A commonly used melamine formaldehyde resin adhesive is "Diaron," which contains 58.2% melamine formaldehyde neat resin, 7% ground walnut shell filler and extender material, 5.8% catalyst and 29% water. A test adhesive was formed by substituting ground cohune nut shell for the walnut shell. Standard test plywood specimens were prepared with the adhesives having 65 lb. glue lines. The specimens were pressed for 4½ minutes at 250 degrees F. Previously mentioned test procedures were followed to evaluate the adhesives. The standard specimens had a tensile strength of 183 p.s.i. with 75% wood fiber failures. The test specimens had a tensile strength of 229 p.s.i. with 90% wood fiber failures. This indicates that the adhesive having the cohune nut shell filler and extender material provides a better bond between the plywood veneers.

RESORCINOL FORMALDEHYDE RESIN ADHESIVE

"Plyophen" a resorcinol formaldehyde resin adhesive was chosen as a standard adhesive for comparison purposes. "Plyophen" contains 69% resorcinol formaldehyde neat resin formation (55% resin), 10.3% norprofil filler and extender material, 13.8% catalyst, and 6.9% water. The test adhesive was formed by substituting ground cohune nut shell for the norprofil. Standard and test plywood specimens were formed from the adhesives. The specimens were pressed for 7 minutes at 158 degrees F. Specimens made with the standard adhesive exhibited tensile strength of 139 p.s.i. at 78% wood fiber failure. In comparison the specimens made with the test adhesive having cohune nut shell filler and extender material exhibited tensile strength of 137 p.s.i. at 87% wood fiber failure.

What we claim as our invention and for which we apply for a United States Letters Patent is:

1. A thermosetting formaldehyde resin adhesive selected from the group consisting of phenol-formaldehyde, urea formaldehyde, melamine formaldehyde and resorcinol formaldehyde; said adhesive having a filler and extender material that includes a flour made from hard shells of cohune tree nuts.

2. A thermosetting formaldehyde resin adhesive as defined in claim 1 having a thermosetting formaldehyde resin mixed with said filler and extender material for use in the manufacture of plywood to bond plywood veneers together.

3. A thermosetting formaldehyde resin adhesive as defined in claim 1 wherein said flour has particles all smaller than 74 microns in diameter and which will therefore all pass through a 200-mesh standard Tyler screen.

4. A thermosetting formaldehyde resin adhesive as defined in claim 1 wherein the filler and extender material further includes a flour made from the husk of cohune nut.

References Cited

UNITED STATES PATENTS

| | | | |
|---|---|---|---|
| 2,507,465 | 5/1950 | Ayers | 260—17.2 |
| 2,733,138 | 1/1956 | Clark | 260—17.2 |

FOREIGN PATENTS 385,062 12/1932 Great Britain.

WILLIAM H. SHORT, Primary Examiner

E. WOODBERRY, Assistant Examiner

U.S. Cl. X.R.

106—288, 291; 161—261, 262; 260—17.3